Oct. 20, 1959  L. E. THOMAS  2,909,154
TETHERING STRAP ARRANGEMENT FOR ANIMALS
Filed June 27, 1958  2 Sheets-Sheet 1

INVENTOR.
LEWIS E. THOMAS
BY
ATT.

Oct. 20, 1959 L. E. THOMAS 2,909,154
TETHERING STRAP ARRANGEMENT FOR ANIMALS
Filed June 27, 1958 2 Sheets-Sheet 2
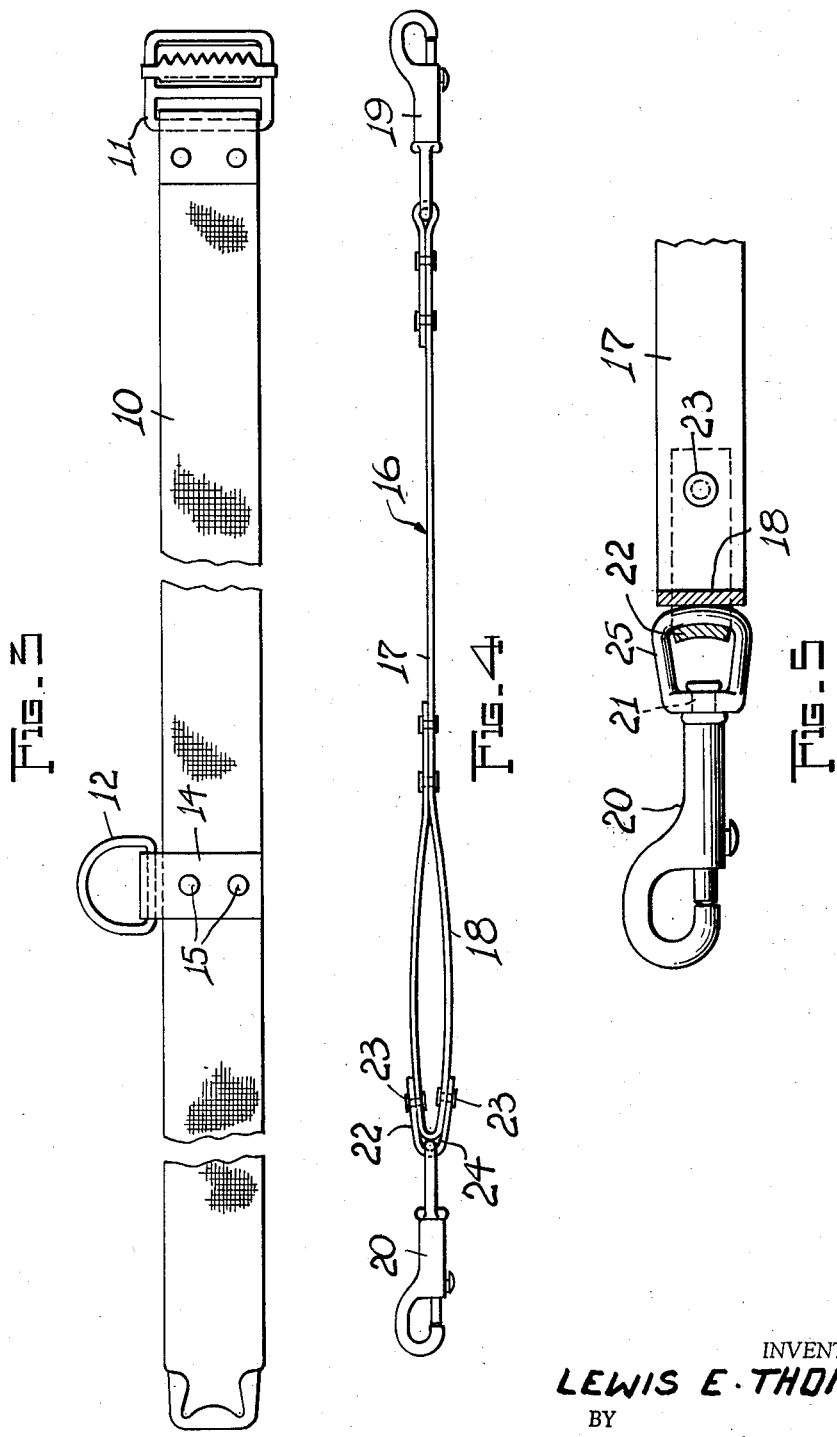
INVENTOR.
LEWIS E. THOMAS
BY
ATT.

United States Patent Office 2,909,154
Patented Oct. 20, 1959

2,909,154

TETHERING STRAP ARRANGEMENT FOR ANIMALS

Lewis E. Thomas, Euclid, Ohio

Application June 27, 1958, Serial No. 745,113

1 Claim. (Cl. 119—109)

This invention relates in general to tethering devices for animals and, more particularly, to an improved tethering strap arrangement for pets such as dogs, cats, etc., adapted to restrain the pets to predetermined positions and predetermined locations such as front or rear seats of automobiles.

The primary object of the invention is the provision of a tethering strap arrangement embodying an elongated base strap member adapted to be frictionally shiftably secured to a stationary object, and a leash-like short strap member non-shiftably and removably secured to the base strap member, the leash-like short strap member including at the ends attachment means adapted to connect the short strap member to a pet and to the base strap member, and the leash-like short strap member additionally including at one end a loop-shaped holding device adapted to hold the short strap member when being attached to the pet and attached to and detached from the base strap member.

Another object of the invention is the provision of a tethering strap arrangement of the type described, in which the loop-shaped holding device at the one end of the leash-like short strap member has attached thereto, in axial alignment therewith, a short strap member forming with the loop-shaped holding means a loop securing the respective attachment means to this end of the leash-like short strap member.

With the above and other objects in view, the invention has other marked superiorities which clearly distinguish it from presently known structures and arrangements of this type. These improvements or characteristics embodying certain novel features of construction and design are clearly set forth in the appended claim and the preferred form of embodiment of the invention hereinafter shown with reference to the accompanying drawings forming part of the specification.

In the drawings:

Fig. 3 is a plan view of the base strap member.

Fig. 4 is a side view of the leash-like short strap member.

Fig. 5 is a fragmentary sectional view of the one end of the leash-like short strap member.

Figure 1:
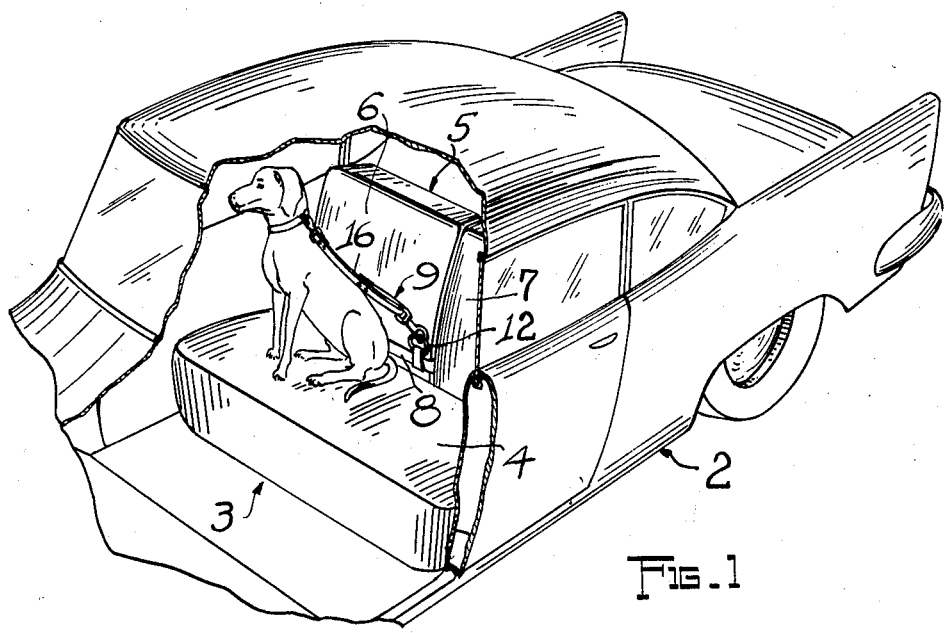
Fig. 1 is a fragmentary perspective view of an automobile showing a tethering strap arrangement according to the invention, tethering a dog seated on the front seat of the automobile.
Figure 2:
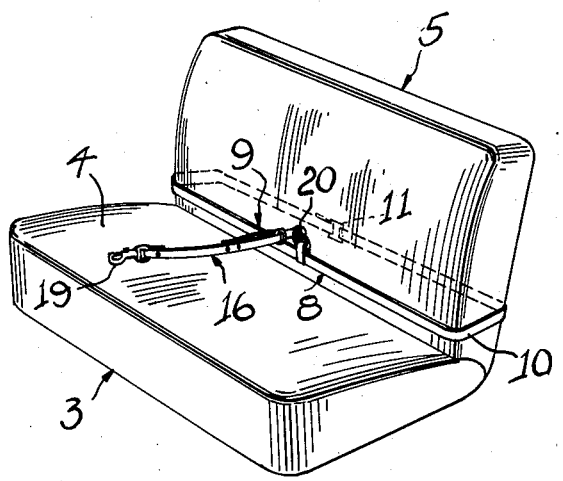
Fig. 2 is a perspective view of an automobile seat structure with the base strap member of the tethering strap arrangement frictionally secured to the back rest of the automobile seat structure.

Referring more particularly to the tethering strap arrangement shown in the drawings, reference numeral 2 denotes an automobile having parts broken away to disclose front seat structure 3 with a seat 4 and a split back rest 5 provided with foldable portions 6 and 7. Back rest portion 6 supports base strap 8 of a tethering strap arrangement 9, the base strap being slipped over portion 6 and frictionally engaged therewith at the lower part thereof by tightening base strap member 8 around portion 6. Base strap member 8 embodies an elongated strap-like body 10 provided at one end with a self-locking beltbuckle 11 and supports at its middle portion a ring-shaped attaching member 12 hingedly connected to the strap-like body 10 by a looped member 14 secured to strap-like body 10 by rivets 15.

The tethering strap arrangement 9 additionally includes a short leash-like strap member 16, the leather body 17 of which at one end is doubled back to provide an elongated, loop-shaped, hand-engaging member 18 and has arranged at opposite ends snap hooks 19, 20 permitting engagement of leash-like strap member 16 with the animal to be tethered and with ring-shaped attaching member 12 on base strap member 8 to tether the animal to the base strap member. Snap hooks 19 and 20 include swivel joints 21 to avoid twisting of leash-like strap member 16 which has snap hook 20 attached to the elongated loop-shaped, hand engaging member 18 by a short strip 22 secured to member 18 by rivets 23 to form with member 18 a loop 24 engaged with the ring-shaped end 25 of snap hook 20.

Tethering strap arrangement 9 permits tethering of a pet to base strap member 8 and release therefrom without freeing the animal when the loop-shaped hand engaging member 18 is gripped and thus provides a combined leash and tethering arrangement permitting continuous full control of the pet.

While there has been shown and described a particular embodiment of the invention, it will be obvious to those skilled in the art that various changes and modifications may be made therein without departing from the invention, therefore, it is intended in the appended claim to cover all such changes and modifications as fall within the true spirit and scope of the invention.

Having thus described my invention, what I claim and desire to secure by Letters Patent is:

An animal retaining device for attachment to the seat of an automobile comprising a seat-encircling loop member having at one end an adjustable fastening means, a pivoted attaching member fixed to said encircling loop member between its ends, and a leash-like strap member having snap-hooks at each end and a loop-shaped hand-engaging control member located on said strap member in between said snap-hooks, whereby the leash-like strap member is adapted by its snap-hooks to be secured to said pivoted fastening means and the harness of an animal to be restrained, whereby such leash-like strap member is adapted to be held at the loop-shaped hand-engaging control member for controlling the animal when the strap member is to be attached to the pivoted attaching member and detached therefrom, and whereby the loop-shaped hand-engaging control member provides a handgrip when using the strap member as a walking leash.

References Cited in the file of this patent

UNITED STATES PATENTS

| | | |
|---|---|---|
| 2,356,715 | Webster | Aug. 22, 1944 |
| 2,861,547 | Dale | Nov. 25, 1958 |